Feb. 14, 1939.  G. W. CARLSON ET AL  2,147,146
AUTOMOTIVE DRIVE AXLE
Original Filed Oct. 16, 1936   3 Sheets-Sheet 3

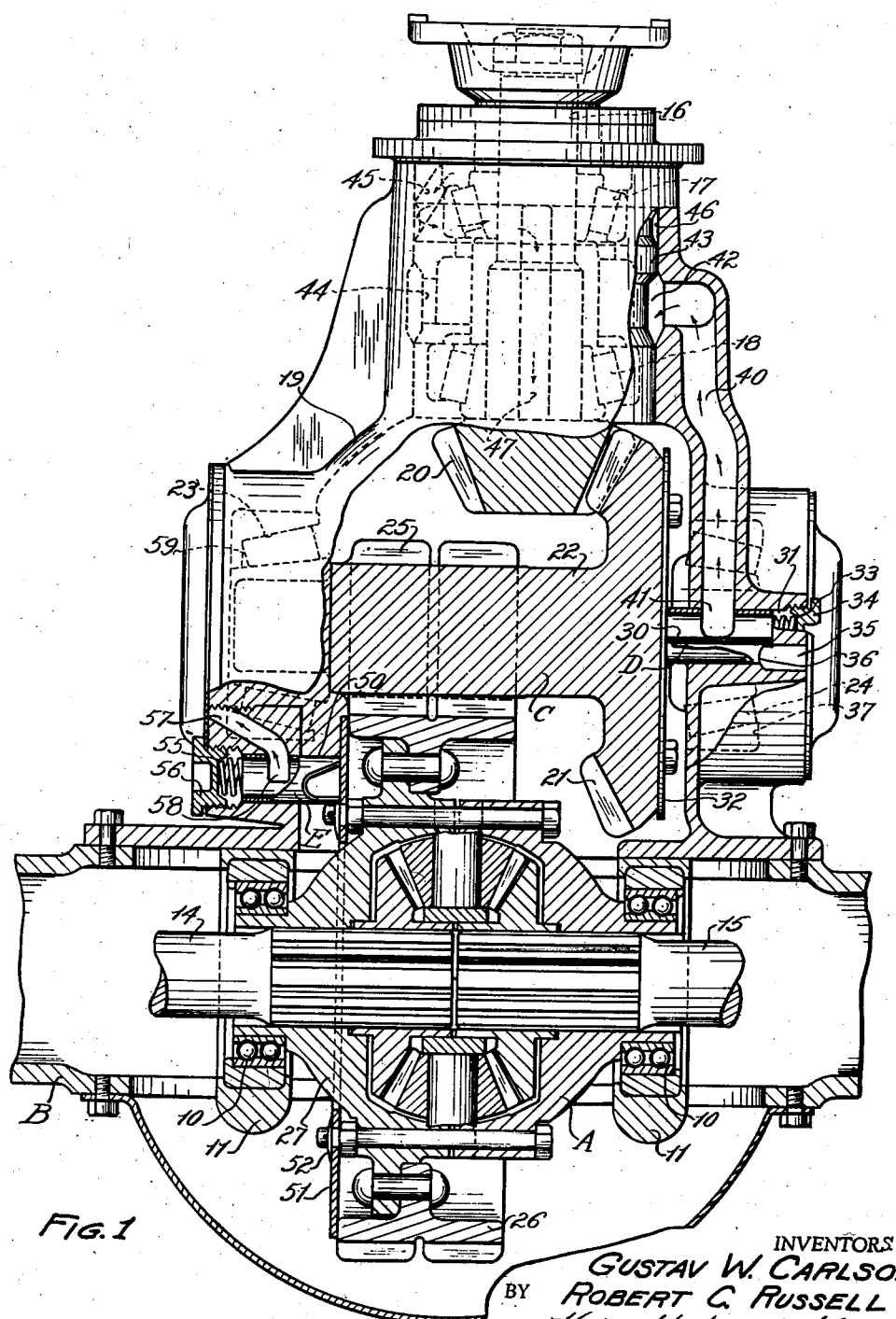

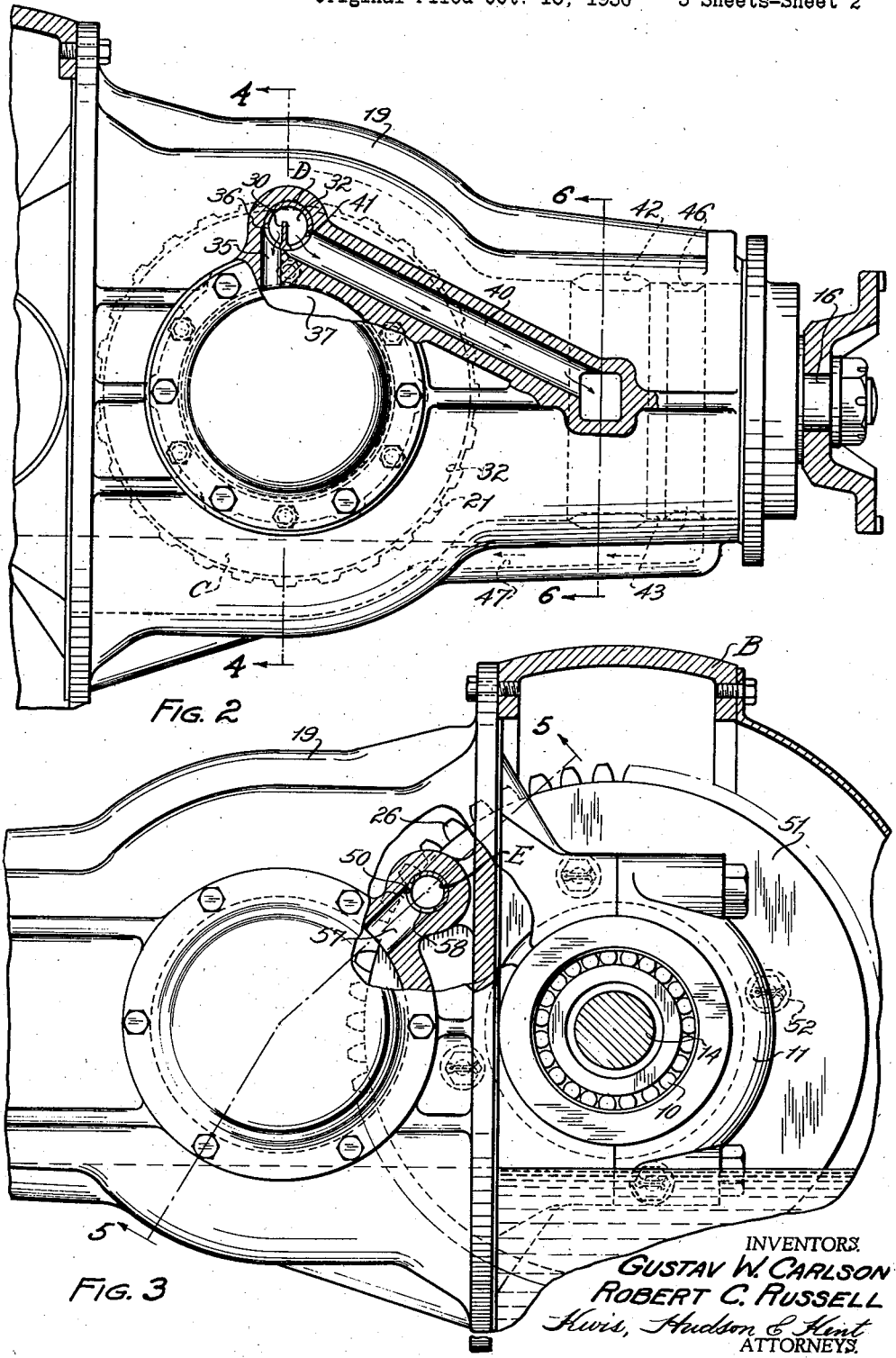

INVENTORS
GUSTAV W. CARLSON
BY ROBERT C. RUSSELL
Kwis, Hudson & Kent
ATTORNEYS.

Patented Feb. 14, 1939

2,147,146

UNITED STATES PATENT OFFICE 2,147,146

AUTOMOTIVE DRIVE AXLE

Gustav W. Carlson, Cleveland Heights, and Robert C. Russell, Shaker Heights, Ohio, assignors to Eaton Manufacturing Company, Cleveland, Ohio, a corporation of Ohio Original application October 16, 1936, Serial No. 105,900. Divided and this application March 19, 1938, Serial No. 197,022

5 Claims. (Cl. 184—11)

The present invention relates to drive axles for automotive vehicles and more particularly to a straight-type double reduction drive axle, and this application is a continuation of our earlier filed application Serial No. 105,900, filed October 16, 1936.

An object of the invention is the provision of a novel and improved straight-type double reduction automotive drive axle comprising means for lubricating a rotatable member or part thereof located above the normal level of the lubricant in the lubricant reservoir in the axle housing at all speeds within the range of operation of the vehicle.

Another object of the present invention is the provision of a novel and improved straight-type double reduction automotive drive axle comprising a scraper member continuously held in resilient engagement with the ring gear and differential assembly and/or the jack shaft assembly for supplying lubricant to various bearings, rotatable members, etc., of the axle located above the normal level of the lubricant in the lubricant reservoir of the axle housing, at all speeds within the range of operation of the vehicle.

The present invention resides in certain novel details of construction, combinations and arrangements of parts, and further objects and advantages thereof will be apparent to those skilled in the art to which it relates from the following description of the preferred embodiment thereof described with reference to the accompanying drawings, forming a part of this specification, in which similar reference characters designate corresponding parts throughout the several views, and in which:

Fig. 1 is a plan view with portions broken away and in section of an automotive double reduction rear axle embodying the present invention.

Fig. 2 is a side elevation, with portions broken away and in section, of the device shown in Fig. 1 looking from the right.

Fig. 3 is a side elevation, with portions broken away and in section, of the device shown in Fig. 1, looking from the left.

Figure 5:
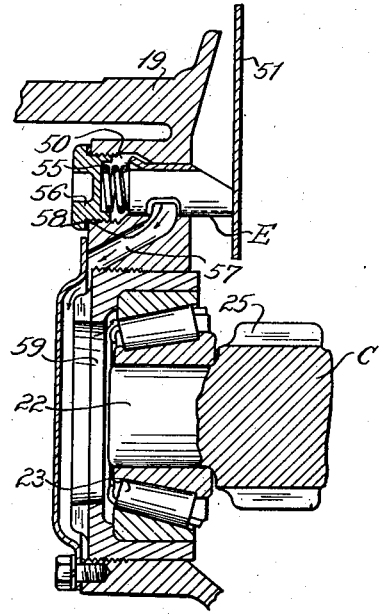
Fig. 5 is a section on the line 5—5 of Fig. 3.
Figure 4:
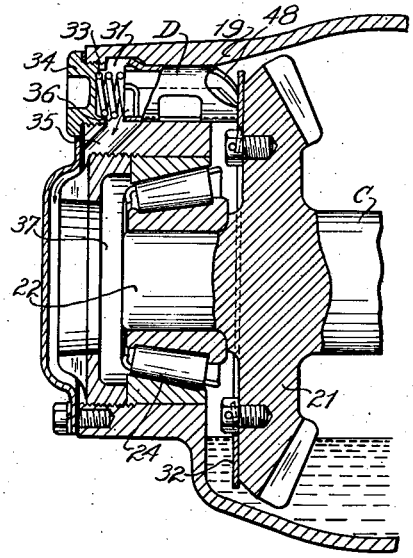
Fig. 4 is a section on the line 4—4 of Fig. 2.
Figure 6:
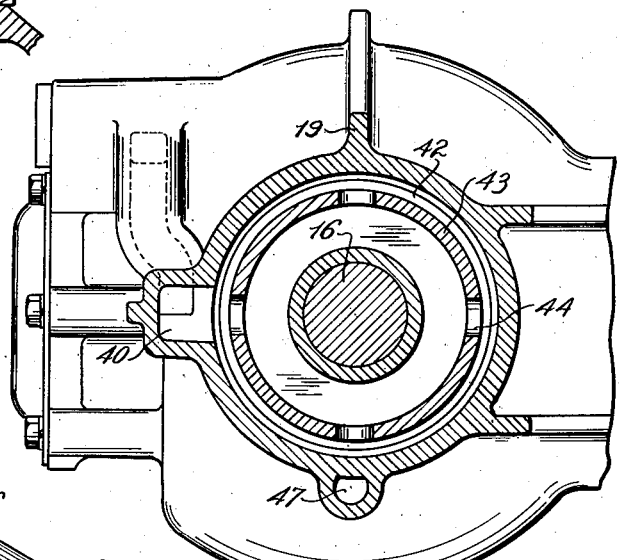
Fig. 6 is a section on the line 6—6 of Fig. 2.

The present invention relates to straight type double reduction drive axles of the type employed in automotive trucks and the like, and is herein illustrated and described as embodied in such an axle. The automotive axle herein shown and described is a well known commercial standard straight-type double reduction rear axle for an automotive truck modified so as to embody the present invention, and only those parts thereof which are necessary to a complete understanding of the present invention will be herein referred to and described.

In referring to the drawings the reference character A designates a four pinion bevel gear type differential assembly rotatably supported on anti-friction bearings 10 in bosses 11 formed integral with the differential carrier housing detachably connected to the axle housing B. The differential assembly is connected to the drive axles 14 and 15 and is adapted to be driven from the drive shaft 16 rotatably supported by anti-friction bearings 17 and 18 in differential carrier housing 19 by a double reduction gear train the first reduction of which is through spiral bevel gears 20 and 21. The bevel pinion 20 is formed integral with the shaft 16 and the bevel gear 21 is formed integral with a countershaft 22 rotatably supported by anti-friction bearings 23 and 24 in the housing 19. The second reduction is through herringbone gears comprising a pinion 25 formed integral with the countershaft 22, and a ring gear 26 continuously in mesh with the pinion 25 fixed to the left-hand differential casing 27 in any convenient manner. The bevel gear 21, herringbone pinion 25, and countershaft 22 are hereinafter referred to as the countershaft assembly and designated in general by the reference character C. The drive shaft 16 is adapted to be connected with and driven from the main propeller or drive shaft of the vehicle in a conventional manner.

Prior to the present invention lubrication of certain of the members of the axle, such as the bearings 17, 18, 23, and 24, was dependent upon centrifugal force, but at slow speeds the centrifugal force produced was insufficient to provide adequate lubrication for these bearings, etc., with the result that they became unduly hot, and in many instances failed. According to the provisions of the present invention the bearings referred to are supplied with an adequate amount of lubrication at all speeds within the range of operation of the vehicle by collectors or scrapers which collect or scrape lubricant from rotating parts or members of the axle which extend into and rotate through the lubricant in the lubricant reservoir in the bottom of the axle housing, and passages or ports, etc. which conduct the lubricant from the collectors or scrapers to the bearings.

As shown, lubricant is supplied to the right-hand bearing 24 for the countershaft assembly C and the bearings 17 and 18 for the shaft 16 by a collector or scraper D of substantially tubular shape provided with a partition or flange 30 projecting from the lower part thereof, slidably supported in a cylindrical aperture 31 in the forward removable housing 19. The collector D is continuously pressed into contact with the right-hand side of a vertical disk 32 bolted or otherwise secured to the right side of the bevel gear 21 by a spring 33 interposed between the collector D and a plug 34 threaded into the outer tapped end of the aperture 31. The disk 32 rotates through the lubricant in the reservoir in the axle housing B, the normal level of which is indicated generally by the dot-dash lines on Figs. 2 and 3. As the disk rotates lubricant is collected or scraped therefrom by the collector D and conducted to the bearing 24 by a passage or port 35 formed in the housing 19, the upper end of which aligns with an opening 36 in the rear half of the scraper D. The lower end of the passage 35 opens into the chamber or recess 37 within which the bearing 24 is located or retained.

Figure 7:
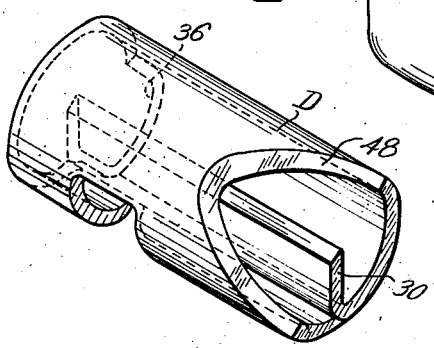
Fig. 7 is a perspective view of the collector or scraper shown in Fig. 4.

The lubricant which is collected in the forward part of the collector or in front of the partition is conducted to the bearings 17 and 18 by a passage or port 40 also formed in the housing or differential carrier 19. The upper end of the passage 40 aligns with an aperture 41 in the collector D, and the lower forward end thereof communicates with or opens into an annular channel or groove 42 exteriorly of a member 43, within which the bearings 17 and 18 are supported. From the channel 42 the lubricant flows into the interior of the member 43 and to the bearings 17 and 18 through holes 44. From the interior of the member 43 the lubricant returns to the reservoir in the axle housing through the bearings 17 and 18. The forward end of the bearing 18 is connected to the reservoir in the axle housing through the medium of a passage 45 which communicates with the chamber or recess at the forward end of the bearing and an annular passage 46 formed by a groove cut in the exterior of the member 43 forwardly of the groove 42 previously referred to. The lower part of the passage 46 opens into the forward end of a passage 47, formed in the housing 19, the rear end of which opens into the lubricant recess. The forward end of the collector D, as viewed in Fig. 7, is made to conform to the disk against which it engages and the upper side 48 is cut away on an angle so that the lubricant on the disk can readily flow into the interior thereof.

Lubricant is supplied to the left-hand bearing 23 by a scraper E, similar to the scraper D less the partition, slidably supported in an aperture 50 in the left-hand side of the housing 19. The scraper E engages a disk 51 secured to the differential assembly A in any convenient manner, as by being positioned under Belleville type spring washers 52 fixed to the end of the bolts which secure the two halves of the differential case together. The scraper E is continuously urged into engagement with the disk 51 by a spring 55 interposed between the outer end thereof and a plug 56 threaded into the outer tapped end of the aperture 50. The lubricant collected therein is conducted to the bearing 23 by a channel or passage 57 in the housing 19, the upper end of which aligns with an aperture 58 in the collector, while the lower end communicates with or opens into the aperture or chamber 59 within which the bearing 23 is supported. The right-hand end of the collector E conforms to the side of the disk 51 against which it engages and the upper side thereof is cut away at an angle to allow the lubricant to readily enter the interior thereof. From the foregoing it will be seen that with the present construction, lubricant will be collected from the disks 32 and 51 by the collectors D and E respectively, and supplied to the respective bearings at all speeds within the range of operation of the vehicle.

The springs interposed behind the scrapers D and E provide a substantially constant pressure between the scrapers and the disks against which they engage and allow the scrapers to readily follow the disks which may not run exactly true. This construction also reduces the noise to a minimum. If desired the partition in the scraper D may be omitted or may be moved to one side or the other, thus diverting a larger or smaller proportion of the lubricant scraped from the disk to one or the other of the bearings. In connection with either collector, it will be apparent that one or more partitions may be employed thus dividing the scraper into a corresponding number of compartments, all of which may be connected to various parts of the axle. In the present instance additional members have been provided in the form of disks which the collectors engage, but it is to be understood that the collectors or scrapers may be made to engage directly against some rotating member of the assembly such as the back of the bevel gear 21 or the left-hand side of the ring gear if desired. The scrapers are insertable into the apertures in the differential carrier from the outside of the housing which together with the fact that all of the operating parts are carried by the differential carrier housing facilitates assembly, maintenance, etc., and produces a rugged reliable construction.

From the foregoing description of the preferred embodiment of the invention it will be apparent that the objects of the invention heretofore enumerated have been accomplished and that there has been provided a novel and improved straight-type double reduction automotive drive axle comprising means for supplying lubricant to a rotating member or part thereof located above the normal level of the lubricant in the reservoir thereof at all speeds within the range of operation of the vehicle. While the preferred embodiment of the invention has been described in considerable detail we do not wish to be limited to the particular construction shown which is merely illustrative of the invention which may be varied within the scope thereof. It is our intention to hereby cover all adaptations, modifications and uses thereof that come within the practice of those skilled in the art to which the invention relates and we particularly point out and claim as our invention the following:

1. In a straight-type double reduction automotive drive axle, the combination of an axle housing, a differential carrier detachably fixed to said axle housing and forming with said axle housing a lubricant reservoir, a ring gear and differential assembly having a continuous annular surface thereon, means for rotatably supporting said assembly in said differential carrier with the lower portion of said annular surface extending below the normal level of the lubricant in said reservoir, a pinion and bevel gear countershaft assembly, means for rotatably supporting said countershaft in said differential carrier with the lower portion thereof extending below the normal level of the lubricant in said reservoir, a pinion in mesh with the bevel gear of said countershaft assembly for rotating the latter, means for rotatably supporting said pinion in said differential carrier, said differential carrier having an aperture therein, a lubricant scraper slidably supported in said aperture in said differential carrier, means for yieldably urging said lubricant scraper into continuous contact with said annular surface of said ring gear and differential assembly, and means for conducting lubricant from said scraper to the second mentioned means.

2. In a straight-type double reduction automotive drive axle, the combination of an axle housing, a differential carrier detachably fixed to said axle housing and forming with said axle housing a lubricant reservoir, a ring gear and differential assembly rotatably supported in said differential carrier with the lower portion thereof extending below the normal level of the lubricant in said reservoir, a pinion and bevel gear countershaft assembly having a continuous annular surface thereon, means for rotatably supporting said countershaft assembly in said differential carrier with the lower portion of said annular surface extending below the normal level of the lubricant in said reservoir, a pinion in mesh with the bevel gear of said countershaft assembly for driving the latter, means for rotatably supporting said pinion in said differential carrier, said differential carrier having an aperture therein, a lubricant scraper or collector slidably supported in said aperture in said differential carrier, means for yieldably urging said lubricant scraper or collector into continuous contact with said annular surface of said pinion and bevel gear countershaft assembly, and means for conducting lubricant from said scraper to the first mentioned means.

3. In a double reduction straight-type automotive drive axle, the combination of an axle housing, a differential carrier detachably fixed to said axle housing and forming with said axle housing a lubricant reservoir, a ring gear and differential assembly rotatably supported in said differential carrier with the lower portion thereof extending below the normal level of the lubricant in said reservoir, a pinion and bevel gear countershaft assembly having a continuous annular surface thereon, means for rotatably supporting said countershaft assembly in said differential carrier with the lower portion of said annular surface extending below the normal level of the lubricant in said reservoir, a pinion in mesh with the bevel gear of said countershaft assembly for rotating the latter, means for rotatably supporting said pinion in said differential carrier, said differential carrier having an aperture therein, a lubricant scraper or collector slidably supported in said aperture in said differential carrier, means for yieldably urging said lubricant scraper or collector into continuous contact with said annular surface of said pinion and bevel gear countershaft assembly, and means including conduits or passages formed in said differential carrier for conducting lubricant from said scraper to the second mentioned means.

4. In a double reduction straight-type automotive drive axle, the combination of an axle housing, a differential carrier detachably fixed to said axle housing, said differential carrier forming with said axle housing a lubricant reservoir and having an aperture therein, a ring gear and differential assembly rotatably supported in said differential carrier with the lower portion thereof extending below the normal level of the lubricant in said reservoir, a pinion and bevel gear countershaft assembly having a continuous annular surface thereon, a bearing for rotatably supporting said countershaft assembly in said differential carrier with the lower portion of said annular surface extending below the normal level of the lubricant in said reservoir, a pinion in mesh with the bevel gear of said countershaft assembly for rotating the latter, a bearing for rotatably supporting said pinion in said differential carrier, a lubricant scraper or collector slidably supported in said aperture in said differential carrier, one end of said lubricant scraper or collector being formed to engage said annular surface of said countershaft assembly, means for yieldably urging said lubricant scraper or collector into continuous contact with said annular surface of said countershaft assembly, and means including conduits or passages formed in said differential carrier for conducting lubricant from said scraper to both said second and said third mentioned bearings.

5. In a double reduction straight-type automotive drive axle, the combination of an axle housing, a differential carrier detachably fixed to said axle housing, said differential carrier having a plurality of apertures therein and forming with said axle housing a lubricant reservoir, a ring gear and differential assembly having a continuous annular surface thereon, a bearing for rotatably supporting said ring gear and differential carrier with the lower portion of said annular surface extending below the normal level of the lubricant in said reservoir, a pinion and bevel gear countershaft assembly having a continuous annular surface thereon, a bearing for rotatably supporting said pinion and bevel gear countershaft assembly in said differential carrier with the lower portion of said annular surface of said countershaft assembly extending below the normal level of the lubricant in said reservoir, a pinion in mesh with the bevel gear of said countershaft assembly for rotating the latter, a bearing for rotatably supporting said pinion in said differential carrier, a lubricant scraper or collector slidably supported in one of said apertures in said differential carrier, a spring positioned in said aperture behind said lubricant scraper or collector for yieldably urging said lubricant scraper or collector into continuous contact with said annular surface of said ring gear and differential assembly, means including a conduit or passage for conducting lubricant from said scraper to the second mentioned bearing, a second lubricant scraper or collector slidably supported in another of said apertures in said differential carrier, a spring positioned in said aperture behind said second lubricant scraper or collector yieldably urging said second lubricant scraper or collector into continuous contact with said annular surface on said pinion and bevel gear countershaft assembly, and means including a conduit or passage formed in said differential carrier for conducting lubricant from said second lubricant scraper or collector to both said second and third mentioned bearings.

GUSTAV W. CARLSON.
ROBERT C. RUSSELL.